US007984477B2

(12) United States Patent
Nadarajah et al.

(10) Patent No.: US 7,984,477 B2
(45) Date of Patent: Jul. 19, 2011

(54) REAL-TIME VIDEO COMPRESSION

(75) Inventors: Dinesh Nadarajah, Austin, TX (US); Brad A. Medford, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 416 days.

(21) Appl. No.: 11/724,809

(22) Filed: Mar. 16, 2007

(65) Prior Publication Data

US 2008/0229356 A1 Sep. 18, 2008

(51) Int. Cl.
*H04N 7/173* (2011.01)
*H04N 7/12* (2006.01)
*H04N 11/02* (2006.01)

(52) U.S. Cl. .................... 725/149; 725/39; 375/240.01; 348/384.1

(58) Field of Classification Search ........................ None
See application file for complete search history.

(56) References Cited

U.S. PATENT DOCUMENTS 6,704,930 B1 * 3/2004 Eldering et al. ................ 725/36
6,816,093 B1 11/2004 Jaquette
6,876,815 B1 4/2005 McGrath
6,940,873 B2 9/2005 Boyle et al.
6,959,300 B1 10/2005 Caldwell et al.
6,965,415 B2 * 11/2005 Lundblad et al. ............. 348/556
7,079,053 B2 7/2006 Kolavi
7,367,041 B2 * 4/2008 Morishita et al. ............... 725/37
2003/0012275 A1 * 1/2003 Boice et al. .............. 375/240.01
2003/0093790 A1 5/2003 Logan et al.
2006/0222329 A1 10/2006 Sano
2006/0294125 A1 12/2006 Deaven
2007/0277199 A1 * 11/2007 Yoon et al. ...................... 725/39
2008/0052414 A1 * 2/2008 Panigrahi et al. ............. 709/246

FOREIGN PATENT DOCUMENTS

WO WO-0169936 9/2001

OTHER PUBLICATIONS

Lee, C. Y., et al., "Multiple multicast tree allocation in IP network", *Computers and Operations Research*, 31(7), (Jun. 2004), 1115-1133.

* cited by examiner

*Primary Examiner* — Hunter B Lonsberry
*Assistant Examiner* — James R Marandi
(74) *Attorney, Agent, or Firm* — Guntin Meles & Gust, PLC; Pablo Meles

(57) ABSTRACT

There are provided a method, a system and machine-readable medium for encoding a video broadcast. The method includes obtaining one or more first compression settings for the video broadcast from an electronic program guide (EPG), the EPG associating the video broadcast with the one or more first compression settings. The method further includes compressing the video broadcast using the one or more first compression settings into a distribution broadcast. Yet further, the method includes distributing the distribution broadcast. There is also provided a method, system and machine readable medium to provide compression settings for encoding a video broadcast. The method includes inserting one or more compression settings into an electronic program guide (EPG) in association with the video broadcast based on a content type of the video broadcast. The method further includes distributing the EPG.

47 Claims, 5 Drawing Sheets

300

| | 302 | 304 | 306 | 308 | 310 |
|---|---|---|---|---|---|
| | Compression Variable | Associated Compression Value | | | |
| | | Sports | Artistic Shows | Movies | . . . . |
| 312 | GOP | 15 Frames | 30 Frames | 15 Frames | . |
| 314 | Color Compression | High | Low | High | . |
| 316 | 3/2 Pull Down | No | No | Yes | . |
| 318 | . . . | . . . | . . . | . . . | . . . |

FIG. 3

REAL-TIME VIDEO COMPRESSION

TECHNICAL FIELD

Example embodiments relate generally to digital video broadcasting. More particularly, example embodiments are directed to a system and method for real-time content-based compression of digital video broadcasts, as well as for provision of compression settings therefor.

BACKGROUND

Recent developments in digital technology have spurred the development and deployment of digital video broadcasting services. The digital video broadcasting services not only broadcast high quality video programming, including high-definition (HD) programs, but also provide the ability to broadcast data including an electronic program guide (EPG). Digital broadcast programs are typically provided by satellite broadcasters, terrestrial broadcasters and cable broadcasters. More recently, digital broadcast programs have also been deployed via the Internet Protocol (IP) by major telecommunication provides.

Video broadcasters have traditionally distributed video broadcasts to viewers using a variety of broadcasting standards, including the analog National Television Standard Committee (NTSC) standard. More recently, with the constant expansion of the number of video broadcast channels, HD video broadcasts and provision of data (including EPG), all of which have placed a premium on bandwidth for transmission, the distribution of video broadcasts has been achieved via digital standards, including the Advanced Technical Systems Committee (ATSC) standard, which use compression techniques to compress the video broadcasts being transmitted. Other digital standards which use compression include the Moving Picture Experts Group H.262 (MPEG-2) standard, the H.264 (MPEG-4) standard and the Digital Video Broadcasting (DVB) standard. While the foregoing standards provide for in-band transmission of EPG with the transmission of the video programming, typically EPG data has been provided out-of-band from the video programming by third-party aggregators of programming schedules, such as Tribune TV and Gemstar.

Digital video broadcasts are transmitted or distributed from the aforementioned video broadcasters via a variety of distributions systems to an end user's digital set top box (STB) which decodes the digital video signal for display on a video display device (e.g., television). The digital video signal may be received by the STB via a satellite dish, a coaxial cable, a telephone line (including digital subscriber line (DSL)), Ethernet, local and wide area wireless technologies, and the like.

Compression techniques used by the foregoing digital broadcasting standards have evolved significantly since their introduction. However, the video broadcasters have not been able to adapt these digital standards for the content of the digital broadcast programs on a dynamic basis. Dynamic content-based compression can improve end user experience and can also reduce transmission load over video broadcasters' distributions systems.

BRIEF DESCRIPTION OF THE DRAWINGS

Some embodiments are illustrated by way of example and not limitation in the figures of the accompanying drawings in which:

FIG. 3 is an example table that illustrates some possible compression settings that may be provided via the EPG, in accordance with FIGS. 1 and 2;

DETAILED DESCRIPTION

Figure 1:
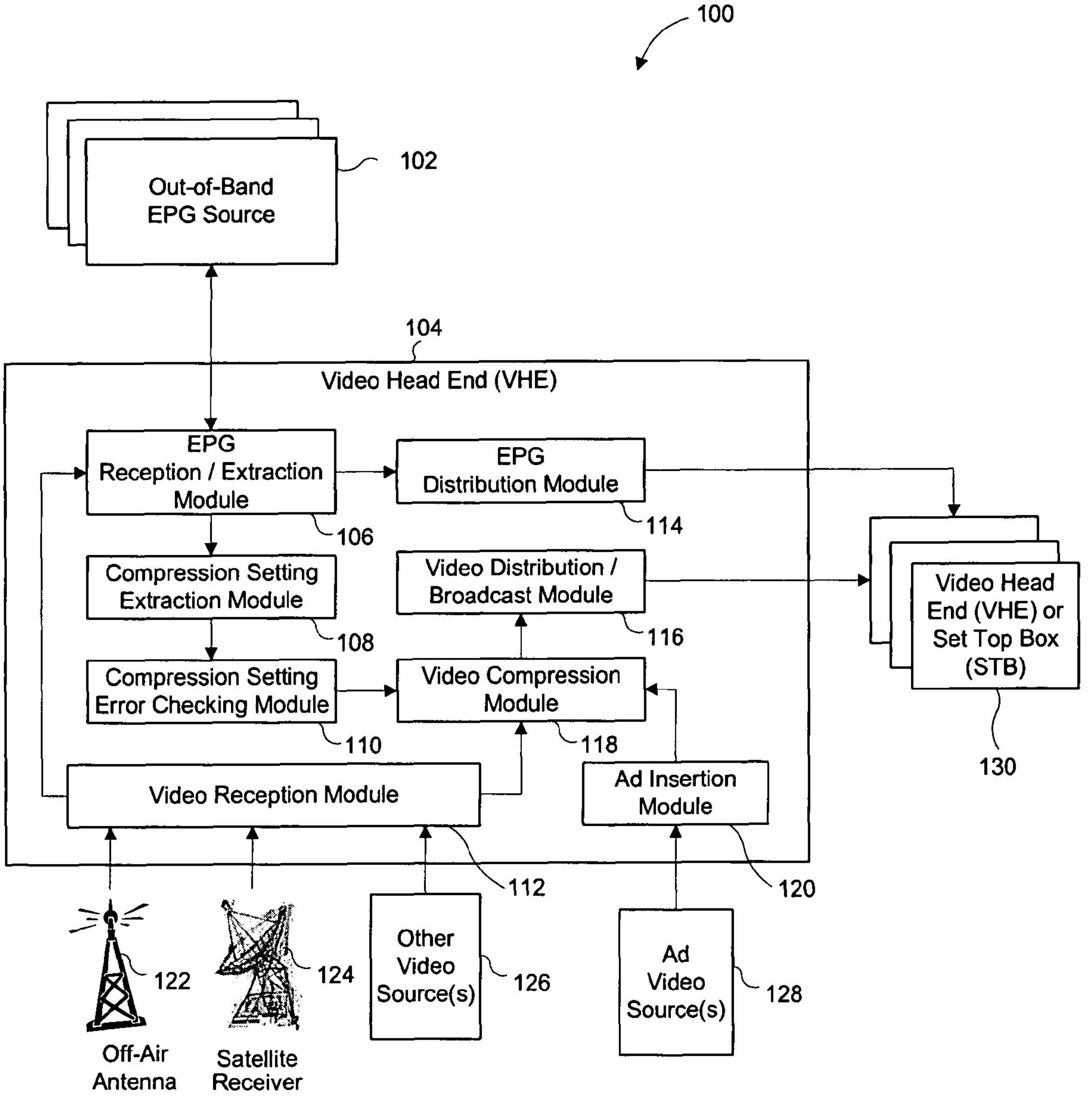
FIG. 1 is a high-level block diagram of an example video broadcasting system that compresses received video programming for distribution using compression settings provided via an electronic program guide (EPG)

An example system, method and machine readable medium for real-time content-based compression of digital video broadcasts are described. Also described are an example system, method and machine readable medium for the provision of compression settings. In the following description, for the purposes of explanation, numerous specific details are set forth in order to provide a thorough understanding of example embodiments. It will be evident, however, to one skilled in the art that an example embodiment may be practiced without these specific details.

Some example embodiments include a system, method and machine readable medium to encode a video broadcast as follows.

In accordance with one example embodiment, there is provided a method for encoding a video broadcast, the method comprising: obtaining one or more first compression settings for the video broadcast from an electronic program guide (EPG), the EPG associating the video broadcast with the one or more first compression settings; compressing the video broadcast using the one or more first compression settings into a distribution broadcast; and distributing the distribution broadcast.

In accordance with another example embodiment, there is provided a system for encoding a video broadcast, the system comprising: a reception/extraction module adapted to obtain one or more first compression settings for the video broadcast from an electronic program guide (EPG), the EPG associating the video broadcast with the one or more first compression settings; a compression module adapted to compress the video broadcast using the one or more first compression settings into a distribution broadcast; and a distribution/broadcast module adapted to distribute the distribution broadcast.

In accordance with yet another example embodiment, there is provided a machine-readable medium including instructions executable by the machine for encoding a video broadcast, the instructions causing the machine: obtain one or more first compression settings for the video broadcast from an electronic program guide (EPG), the EPG associating the video broadcast with the one or more first compression settings; compress the video broadcast using the one or more first compression settings into a distribution broadcast; and distribute the distribution broadcast.

Other example embodiments include a system, method and machine readable medium to provide compression settings for encoding a video broadcast as follows.

In accordance with one example embodiment, there is provided a method to provide compression settings for encoding a video broadcast, the method comprising: inserting one or more compression settings into an electronic program guide (EPG) in association with the video broadcast based on a content type of the video broadcast; and distributing the EPG.

In accordance with another example embodiment, there is provided a system to provide compression settings for encoding a video broadcast, the system comprising: an electronic program guide source adapted to insert one or more compression settings into an electronic program guide (EPG) in association with the video broadcast based on a content type of the video broadcast, and adapted to distribute the EPG.

In accordance with yet another example embodiment, there is provided a machine-readable medium including instructions executable by the machine to provide compression settings for encoding a video broadcast, the instructions causing the machine to: insert one or more compression settings into an electronic program guide (EPG) in association with the video broadcast based on a content type of the video broadcast; and distribute the EPG.

FIG. 1 is a high-level block diagram of an example video broadcasting system 100 that compresses received video programming for distribution using compression settings provided via an electronic program guide (EPG). The video broadcasting system 100 includes one or more out-of-band electronic program guide (EPG) sources 102, a video head end (VHE) 104 (either local VHE or Super VHE), a video head end (VHE) or set top box (STB) 130 and multiple video sources 122-128. The VHE 104 is communicatively interconnected to the out-of-band EPG source 102 and to the VHE or STB 130. To improve readability and clarity, a generic video head end (VHE) 104 is illustrated in FIG. 1. The VHE 104 may be a super video head end (SVHE) or a local video head end (VHE). More specifically, the VHE 104 may be a super video head end (SVHE) which receives a multiplicity of video broadcasts from global video sources 122-128 and retransmits the video broadcasts for distribution to a local VHE 130, which may in turn broadcast a video broadcast received from the SVHE to the end user's STB (not shown). Likewise, the VHE 104 may also be a local VHE, which receives video broadcasts from a SVHE (not shown) and in turn broadcasts a video broadcast received from the SVHE to the end user's STB 130. In addition to receiving video broadcasts from the SVHE, the local VHE 104 may also receive local video broadcasts from local video sources 122-128 and may further broadcast a local video broadcast to the end user's STB 130. It is noted that the local VHE 104 may also have switch functionality (not shown) to switch between video broadcasts received from the SVHE and local video sources 122-128 for delivery to the end user's STB.

As already noted above in reference to FIG. 1, one generic VHE 104 is described in detail relating to compressing received video programming for distribution using one or more compression settings provided via an electronic program guide (EPG). However, the broadcasting system 100 may include multiple SVHEs; each SVHE may be interconnected to multiple VHEs; and each VHE may be interconnected to multiple STBs. The interconnection between the SVHE and the VHE may be accomplished via a long haul transport network (e.g., gigabit Ethernet network, Asynchronous Transfer Mode (ATM) network, frame relay network and the like) using a variety of protocols. The interconnection between the VHE and the STB may be accomplished via a fiber to the home (FTTH), fiber to the node (FTTN), telephone (including digital subscriber line (DSL)), coaxial cable, hybrid fiber/coaxial, and combinations thereof, suing a variety of protocols. Alternate existing or to-be-developed connections and protocols may also be employed to interconnect the SVHE to the VHE and the VHE to the STB.

Now with particular reference to the VHE 104 of FIG. 1, the VHE 104 includes a video reception module 112 that receives video programming of video broadcasts from multiple video sources, including off-air antenna 122, satellite receiver 124, as well as any other video sources 126, which may include fiber feed sources, video servers and tape machines, which serve video programming. The video programming received by the video reception module 112 may be in a variety of video formats, including NTSC, ATSC, MPEG-2, MPEG-4, DVB, Windows Media, baseband digital, and other currently available or to-be-developed formats. The VHE 104 further includes a video compression module 118 and a video distribution/broadcast module 116 that cooperate with the video reception module 112 to compress and distribute (or broadcast) the video programming received by the video reception module 120 to VHE or STB 130 in a particular video format. More specifically, the video reception module 112 may decode (via one or more video decoders) the video programming received in the aforementioned different formats into a standardized format. Upon decoding a particular video broadcast from a source 122-126, the video reception module will notify a compression setting extraction module 108 as to which video broadcast is being decoded for subsequent encoding by video compression module 118, as will be described below. The notification may be generated by the video reception module 112 using system interrupts based on video broadcasts received from video sources 122-126. More specifically, the decoded video broadcast is transmitted from video reception module 112 to a particular video encoder (not shown) in the video compression module 118 (which may include one or more encoders). The particular video encoder may be assigned an IP address, an RF channel and the like. The video reception module 112 will notify the compression setting extraction module 108 of the particular assignment and the compression setting extraction module 108 correlates that assignment to the particular video broadcast in the EPG. Thus, the video compression module 118 may encode (via one more video encoders) the video programming provided in the standardized format by the video reception module 112 into a particular digital format (e.g., MPEG-2, MPEG-4 and the like). The video compression module 118 may use one or more real-time content-based compression settings associated with the particular content of the video programming to encode the video programming provided in the standardized format, as will be described in greater detail below. In turn, the video distribution/broadcast module 116 ultimately distributes or broadcasts the encoded video programming to the VHE or STB 130. The video distribution/broadcast module 116 may further multiplex (e.g., via statistical multiplexing) video broadcasts of multiple digital video broadcast channels over one carrier frequency allocation (e.g., 6 MHz or 8 MHz), which is a typical carrier frequency allocation that may be used for one analog channel.

Figure 2:
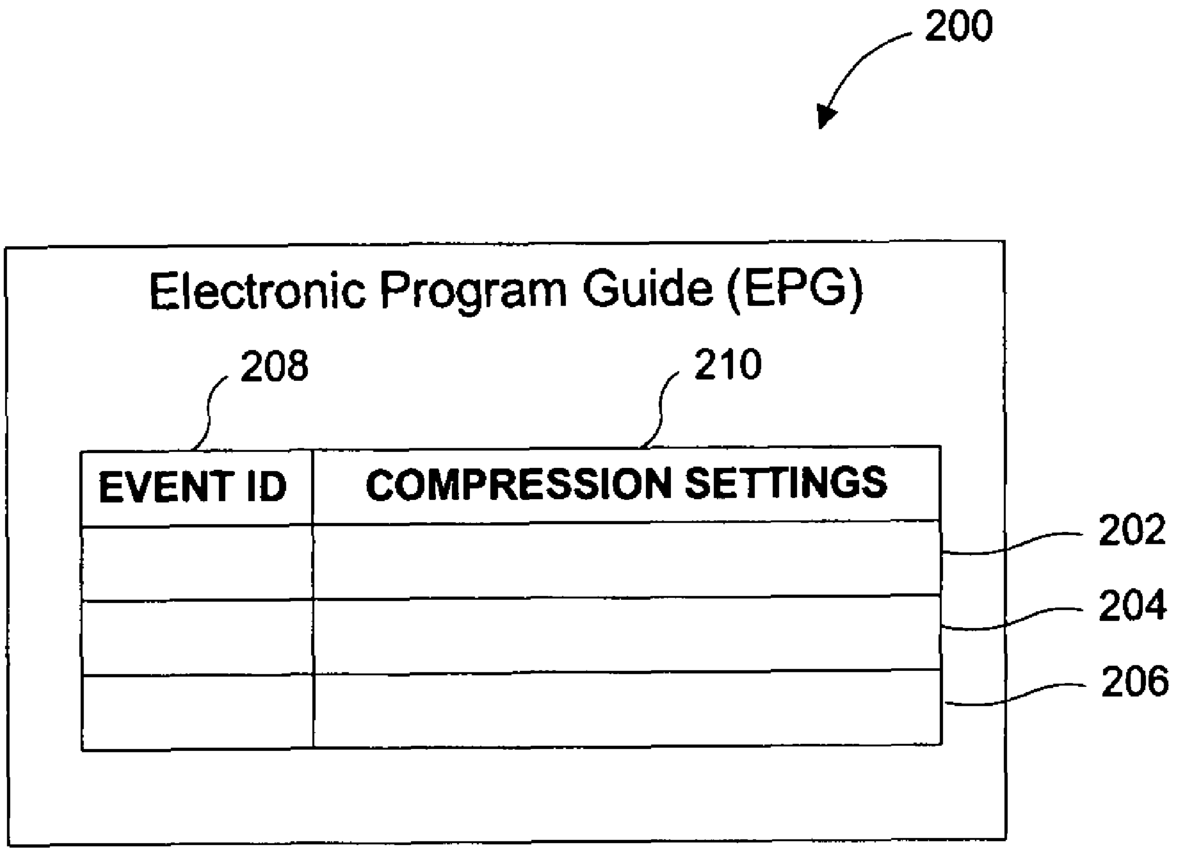
FIG. 2 is a diagram illustrating an example EPG including compression settings received or extracted by the video head end (VHE) of the video broadcasting system, in accordance with FIG. 1.

Further with reference to FIG. 1, the VHE 104 also includes an electronic program guide (EPG) reception/extraction module 106, which may receive EPG from one or more out-of-band EPG sources 102 or extract in-band EPG from video programming received by VHE 104 from video sources 122-126. The out-of-band EPG may be received from out-of-band EPG sources 102 in various formats, such as XML, flat file (CSV file) or as ATSC standard A/65 data structure, as well as any other format capable of transmitting EPG and associated compression settings described herein. The extracted in-band EPG from video sources 122-126 may be in ATSC standard A/65 data structure, as well as any other format capable of transmitting EPG and associated compression settings described herein. The received/extracted EPG may be stored in the VHE 104 in a database, data structure or file (not shown) and may further be distributed within the video broadcasting system 100 to VHE or STB 130 via the EPG distribution module 114. As will be illustrated in FIGS. 2 and 3 and described hereinafter in greater detail, the EPG includes one or more compression settings associated with each video broadcast based on a content type of the video broadcast (e.g., sports, artistic shows, movies and the like). The foregoing content-based compression settings may be provided by the EPG aggregators, the network broadcasters and the like. More specifically, the EPG aggregators, network broadcasters or the like may associate one or more compression settings with a particular video broadcast based on its content type and may further insert these compression settings into the EPG for that particular video broadcast as illustrated in FIGS. 2 and 3 below. The EPG may be distributed out-of-band from EPG sources 102 or inserted into video programming and distributed in-band via video sources 122-126.

Further with reference to the EPG data of FIG. 1, the EPG reception/extraction module 106 may receive the EPG from one or more out-of-band EPG sources 102. An out-of-band EPG source 102 may be an EPG aggregator (e.g., Tribune TV and Gemstar), which aggregates and maintains EPG data for multiple broadcast networks (e.g., ABC, NBC, CBS, ESPN and the like). The out-of-band EPG may further be provided by the one or more broadcast networks (e.g., ABC, NBC, CBS, ESPN and the like). Still further, if the VHE 104 is a local VHE, the out-of-band EPG may further be provided by the SVHE. Any other source of out-of-band EPG not enumerated herein and/or that may hereinafter be developed is contemplated as an out-of-band EPG source 102. The EPG reception/extraction module 116 may further extract in-band EPG provided in the above-described standard from the video programming decoded by the video reception module 112, which is received from the respective video sources 122-126. The video sources 122-26 may or may not provide in-band EPG data.

Now further with reference to FIG. 1, from the EPG received or extracted by the EPG reception/extraction module 106, one or more compression settings are extracted by the compression setting extraction module 108 based on notification of the particular video broadcast being decoded by the video reception module 112. The compression setting error checking module 110 performs and error check on the one or more compression settings (e.g., whether a particular compression setting is within a predetermined range). If a compression setting fails the error check, the compression setting error checking module 110 sets that compression setting to a default value. The compression setting error checking module 110 may use an error check data structure or table (not shown) that includes for each compression setting a compression setting name or ID, its valid range and a default value. After the error check, the error checked one or more compression settings are provided to the video compression module 118 which encodes, using the one or more compression settings, the video broadcast provided in the standardized format from the video reception module 112 into a particular format for distribution by the video distribution/broadcast module 116. At certain instances, the video reception module 112 may notify (e.g., via system interrupt) an ad insertion module 120 to provide an advertisement for insertion into the video broadcast being encoded by the video compression module 118. The reception module 112 may receive an ad insertion signal from video source (e.g., 122-126) transmitting the particular video broadcast that an advertisement is to be inserted.

Further with reference to ad insertion of FIG. 1, the ad insertion module 120 provides the advertisement and one or more compression settings associated with encoding the advertisement to the video compression module 118. The video compression module 118 encodes the advertisement provided into the video broadcast using the one or more associated compression settings and the video broadcast (including the advertisement) is distributed by the video distribution/broadcast module 116. The video broadcast from the video reception module 112 is not encoded into the video broadcast for distribution at this time. Ad video source(s) 128 may provide multiple advertisements to the ad insertion module 120, which may store the advertisements in a database (not shown) for future selection and insertion at required times, or the ad video source 128 may provide one advertisement at a time for insertion on the fly by the ad insertion module 120. After advertisement insertion, the video broadcast from the video reception module 112 continues and is transmitted to the video compression module 118 for encoding using the one or more compression setting associated with the video broadcast. This may be accomplished based on ad termination signal from the video source (e.g., 122-126) transmitting the particular video broadcast, which is timed based on ad duration or manually processed.

FIG. 2 is a diagram illustrating an example EPG 200 including compression settings received or extracted by the video head end (VHE) 104 of the video broadcasting system 100, in accordance with FIG. 1. As illustrated in FIG. 2, the EPG 200 may include EPG data for multiple video broadcasts 202-206 in accordance with ATSC standard A/65. Each of the video broadcast 202-206 is identified by a event ID 208 and includes associated one or more compression settings 210. As mentioned, the EPG 200 identifies video broadcasts 202-206 in accordance with the ATSC standard A/65, which is commonly referred to an event information table (EIT) and which designates their respective time slots (not shown) and broadcast channels (not shown) (e.g., carrier frequencies coupled with transport stream identifier (TSID)). In addition to the EIT table, a plurality of other tables not enumerated here, which describe or identify the video broadcasts and associated features, may be provided in accordance with the ATSC standard A/65. It is to be understood that a particular video broadcast is described in the EPG by the standard-appropriate one or more tables (e.g., EIT, and the like) and one or more compression settings are included in the one or more tables (e.g., EIT or another table) of the EPG for the associated video broadcast. As already noted herein, the EPG 200 may be in a variety of other formats, such as such as XML, CSV file, as well as any other format capable of transmitting EPG data and associated compression settings described herein.

FIG. 3 is an example table 300 that illustrates some possible compression settings 210 that may be provided via the EPG 200, in accordance with FIGS. 1 and 2. Table 300 depicts plural compression settings 312-318. A particular compression setting is composed of a compression variable 302 and one of the associated compression values 304-310. The compression settings 312-318 illustrated in table 300 are organized based on content of a video broadcast encoded by the video compression module 118 in FIG. 1. For example, if the video broadcast being encoded includes sports-related content (e.g., a fast-paced action), then compression settings 312-318 set in compression settings 212 of the EPG 200 are set for values that would be well suited for that type of content. Specifically, for a sports-type broadcast, group of picture (GOP) is set for 15 frames, color compression is set to High (e.g., one), and 3/2 pull down is set to No (e.g., zero). If on the other hand the video broadcast is an artistic-type broadcast, then the GOP is set to 30 frames, color compression is set to Low (e.g., zero) and 3/2 pull down is set to No (e.g., zero). If however the video broadcast is an movie-type broadcast, then the GOP is set to 15 frames, color compression is set to High (e.g., one) and 3/2 pull down is set to YES (e.g., one). It is noted that additional variables 318 and an associated value 304-308 may be provided for each video broadcast type illustrated in table 300 of FIG. 3. It is also noted that additional video broadcast types 310 and associated values may be provided, as may be desired. Lastly, the compression settings 312-318 may be provided in the EPG 200 as comma-delimited variable/value pairs, or just comma delimited values if the positions of the values are predetermined to correspond to the particular variables. Other schemes enabling transmission of compression settings may also be employed, as may be desired.

Figure 4:
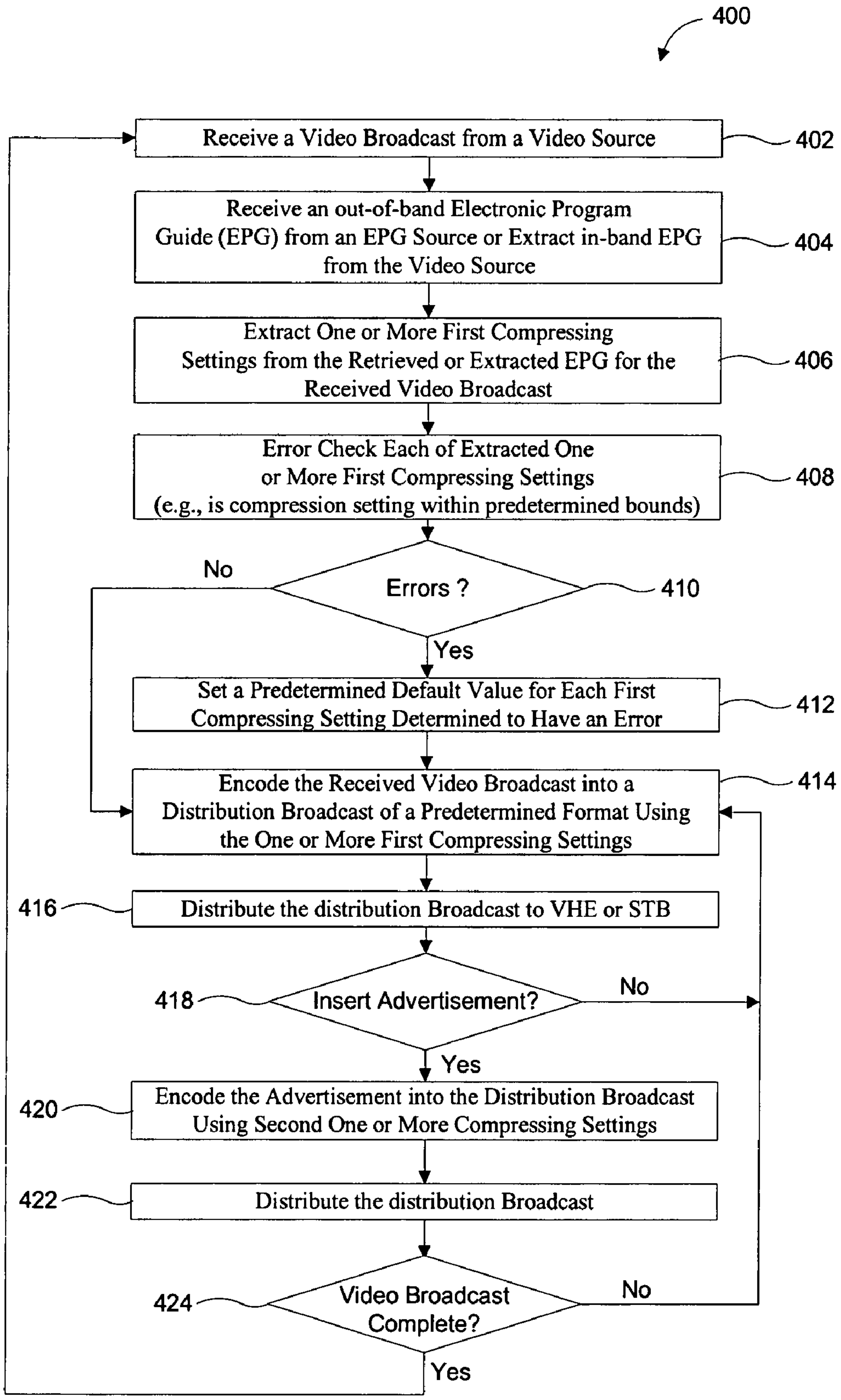
FIG. 4 is flowchart that illustrates an example method used by the VHE to obtain compression setting from the EPG to compress received video programming for distribution in accordance with FIGS. 1-3.

FIG. 4 is flowchart that illustrates an example method 400 used VHE 104 to obtain compression setting from the EPG 200 to compress received video programming for distribution in accordance with FIGS. 1-3. The method 400 begins at operation 402 in which the video reception module 112 receives a video broadcast from a video source 122-126. At operation 404, the EPG extraction/reception module 106 receives an out-of-band EPG from EPG source 102 or extracts an in-band EPG from a video source (e.g., extracting in-band EPG from video programming received by the video reception module 112 from video source 122-126). Compression setting extraction module 108 obtains one or more first compression setting from the received or extracted EPG for the particular video broadcast received at operation 406. At operation 408, compression setting error checking module 110 checks each of the one or more compression settings for errors (e.g., whether the compression setting is within a predetermined range or bounds). If at operation 410 it is determined that a compression setting is outside predetermined range, the method 400 continues at operation 412 in which the compression setting error checking module 110 sets the compression setting to a default value and the method 400 continues at operation 414. Alternatively, if there are no errors determined at operation 410, the method 400 continues at operation 414. In operation 414, the video compression module 118 encodes the received video broadcast into a distribution broadcast of a predetermined format using the one or more first compression settings from the EPG 200 extracted in operation 406. At operation 416, the video distribution/broadcast module 116 distributes or broadcasts the distribution broadcast to the VHE or STB 130. The video reception module 112 thereafter determines whether a video advertisement is to be inserted into the distribution broadcast at operation 418. If so, at operation 420, the video compression module 118 encodes the advertisement into the distribution broadcast using a second one or more compression settings, the advertisement and settings provided by the add insertion module 120. At operation 422, the video distribution/broadcast module 116 distributes or broadcasts the distribution broadcast to VHE or STB 130. At operation 422, the video reception module determines whether the video broadcast being received from video sources 122-126 is complete. If it is determined that the received video broadcast is not complete, the method 400 continues at operation 414, and operations 414-422 are repeated until the received video broadcast is completed. Alternatively, if the video broadcast is complete, the method 400 continues at operation 402 in which another video broadcast is received and operations 402-422 are repeated for that video broadcast.

Figure 5:
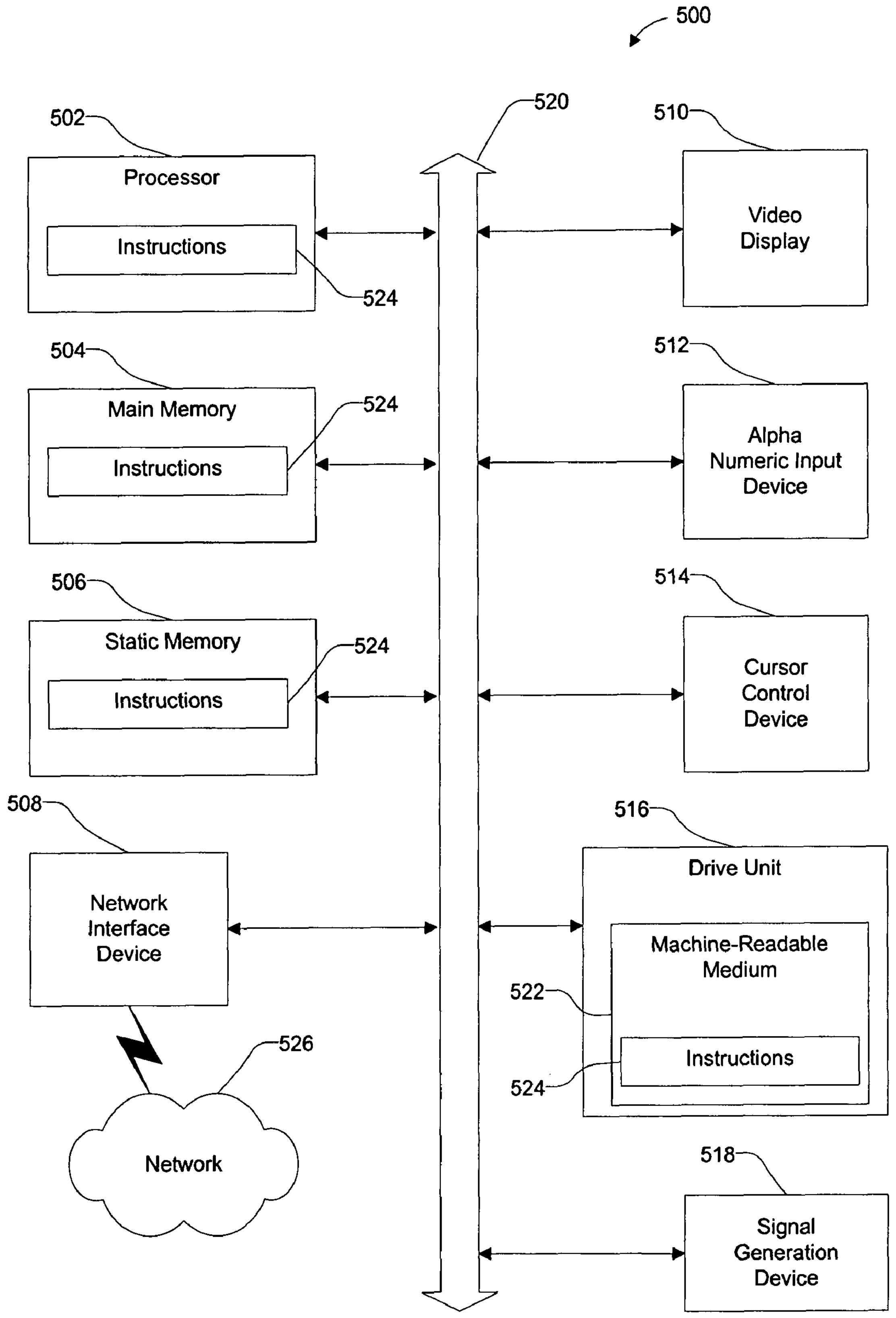
FIG. 5 is a diagrammatic representation of machine in an example form of a computer system within which a set of instructions, for causing the machine to perform any one or more of the methodologies described herein in FIGS. 1-4, may be executed.

FIG. 5 is a diagrammatic representation of machine in an example form of a computer system within which a set of instructions, for causing the machine to perform any one or more of the methodologies discussed herein in FIGS. 1-4, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 5, the example computer system 500 includes a processor 502 (e.g., a central processing unit (CPU), a graphics processing unit (GPU) or both), a main memory 504 and a static memory 506, which communicate with each other via a bus 520. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 508.

Still further with reference to FIG. 5, the disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 508 utilizing any one of a number of well-known transfer protocols (e.g., HTTP).

Lastly with reference to FIG. 5, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for real-time content-based compression of digital video broadcasts have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method for encoding a video broadcast, the method comprising:

directly obtaining first compression settings for the video broadcast from data embedded within an electronic program guide (EPG), the EPG associating the video broadcast with the first compression settings, wherein the data identifies values for the first compression settings, wherein the data is the only source of the first compression settings, and wherein the first compression settings comprise a group of pictures compression setting, a color compression setting, and a 3/2 pull down compression setting;

inserting an advertisement in the video broadcast using one or more advertisement compression settings separate from the first compression settings, the advertisement insertion being in response to an advertisement insertion signal from a video source;

compressing the video broadcast using the first compression settings into a distribution broadcast; and distributing the distribution broadcast.

2. The method for encoding a video broadcast of claim 1, further comprising:

inserting the first compression settings into the EPG in association with the video broadcast based on a content type of the video broadcast; and distributing the EPG out-of-band from the video broadcast.

3. The method for encoding a video broadcast of claim 2, wherein the EPG is received out-of-band from the video broadcast.

4. The method for encoding a video broadcast of claim 1, further comprising:

inserting the EPG into video programming; and distributing the EPG in-band with the video programming.

5. The method for encoding a video broadcast of claim 4, wherein obtaining includes extracting EPG distributed in-band with the video programming.

6. The method for encoding a video broadcast of claim 1, wherein distributing includes distributing of the distribution broadcast from a super video head end (SVHE) to a video head end (VHE).

7. The method for encoding a video broadcast of claim 1, wherein distributing includes broadcasting the distribution broadcast from a video head (VHE) to a set top box (STB).

8. The method for encoding a video broadcast of claim 1, further comprising receiving the video broadcast from a video source, wherein the EPG includes EPG data for multiple video broadcasts where each video broad cast is identified by an event identifier and includes associated compression settings for each video broadcast within the EPG.

9. The method for encoding a video broadcast of claim 8, further comprising decompressing the received video broadcast into a first format.

10. The method for encoding a video broadcast of claim 9, wherein compressing includes compressing the video broadcast of the first format to the distribution broadcast of a second format.

11. The method for encoding a video broadcast of claim 10, wherein distributing includes distributing the distribution broadcast of the second format.

12. The method for encoding a video broadcast of claim 1, further comprising:

determining whether each of the first compression settings is in a predetermined range; and selectively defaulting each of the first compression settings to a default value if not in the predetermined range.

13. The method for encoding a video broadcast of claim 1, further comprising compressing an advertisement into the distribution broadcast using one or more second compression settings.

14. A system for encoding a video broadcast, the system comprising:

a reception/extraction module adapted to directly obtain first compression settings for the video broadcast from data stored within an electronic program guide (EPG), the EPG associating the video broadcast with the first compression settings, wherein the data identifies values for the first compression settings, and wherein the first compression settings comprise at least a group of pictures compression setting, a color compression setting, and a 3/2 pull down compression setting;

a compression module adapted to compress the video broadcast using the one or more first compression settings into a distribution broadcast;

an advertisement insertion module adapted to insert an advertisement in the video broadcast using one or more advertisement compression settings that are separate from the first compression settings, the advertisement insertion being in response to an advertisement insertion signal from a video source; and a distribution/broadcast module adapted to distribute the distribution broadcast.

15. The system for encoding a video broadcast of claim 14, further comprising an EPG source adapted to:

insert the first compression settings into the EPG in association with the video broadcast based on a content type of the video broadcast, wherein the data is the only source of the first compression settings, and distribute the EPG out-of-band from the video broadcast.

16. The system for encoding a video broadcast of claim 15, wherein the reception/extraction module is further adapted to receive the EPG distributed out-of-band from the video broadcast.

17. The system for encoding a video broadcast of claim 14, further comprising a video source adapted to:

insert the EPG into video programming; and distribute the EPG in-band with the video programming.

18. The system for encoding a video broadcast of claim 17, wherein the reception/extraction module is further adapted to extract EPG distributed in-band with the video programming.

19. The system for encoding a video broadcast of claim 14, wherein the distribution/broadcast module is further adapted to distribute the distribution broadcast from a super video head end (SVHE) to a video head end (VHE).

20. The system for encoding a video broadcast of claim 14, wherein the distribution/broadcast module is further adapted to broadcast the distribution broadcast from a video head (VHE) to a set top box (STB).

21. The system for encoding a video broadcast of claim 14, further comprising a video reception module adapted to receive the video broadcast from a video source.

22. The system for encoding a video broadcast of claim 21, wherein the video reception module is further adapted to decompress the received video broadcast into a first format.

23. The system for encoding a video broadcast of claim 22, wherein the compression module is further adapted to compress the video broadcast of the first format to the distribution broadcast of a second format.

24. The system for encoding a video broadcast of claim 23, wherein the distribution/broadcast module is further adapted to distribute the distribution broadcast of the second format.

25. The system for encoding a video broadcast of claim 14, further comprising a compression setting error checking module adapted to determine whether each of the one or more first compressing settings is in predetermined range, and selectively default each of the one or more first compressing settings to a default value if not in the predetermined range.

26. The system for encoding a video broadcast of claim 14, further comprising an ad insertion module adapted to compress an advertisement into the distribution broadcast using one or more second compression settings.

27. A non-transitory machine-readable medium including instructions executable by the machine for encoding a plurality of video broadcasts, the instructions causing the machine to:

obtain first compression settings for each of the video broadcasts of the plurality of video broadcasts from data embedded within an electronic program guide (EPG), the EPG associating each of the video broadcasts with the first compression settings, wherein the data identifies values for the first compression settings, wherein the data is the only source of the first compression settings, and wherein the first compression settings comprise a group of pictures compression setting, a color compression setting, and a 3/2 pull down compression setting;

insert an advertisement in one of the video broadcasts using one or more advertisement compression settings separate from the first compression settings, the advertisement insertion being in response to an advertisement insertion signal from a video source;

compress one of the video broadcast using the one or more first compression settings and the advertisement using one or more advertisement compression settings into a distribution broadcast;

insert one or more first compression settings into the EPG in association with the video broadcast based on a content type of the video broadcast;

distribute the distribution broadcast; and distribute the EPG with the inserted first compression settings out-of-band from the video broadcast.

28. The machine-readable medium of claim 27, wherein the instructions causing the machine to obtain the first compression settings comprise instructions to receive the EPG distributed out-of-band from the video broadcast.

29. The machine-readable medium of claim 27, further comprising instructions causing the machine to:

insert the EPG into video programming; and distribute the EPG in-band with the video programming.

30. The machine-readable medium of claim 27, wherein instructions causing the machine to obtain one or more first compression settings include instructions to extract EPG distributed in-band with the video programming.

31. The machine-readable medium of claim 27, wherein instructions causing the machine to distribute include instructions to distribute the distribution broadcast from a super video head end (SVHE) to a video head end (VHE).

32. The machine-readable medium of claim 27, instructions causing the machine to distribute include instructions to broadcast the distribution broadcast from a video head (VHE) to a set top box (STB).

33. The machine-readable medium of claim 27, wherein the instructions further cause the machine to receive the video broadcast from a video source.

34. The machine-readable medium of claim 33, wherein the instructions further cause the machine to decompress the received video broadcast into a first format.

35. The machine-readable medium of claim 34, wherein instructions causing the machine to compress further include instructions to compress the video broadcast of the first format to the distribution broadcast of a second format.

36. The machine-readable medium of claim 35, wherein instructions causing the machine to distribute further include instructions to distribute the distribution broadcast of the second format.

37. The machine-readable medium of claim 27, further comprising instructions causing the machine to:

determine whether each of the first compressing settings is in predetermined range; and selectively default each of the first compressing settings to a default value if not in the predetermined range.

38. The machine-readable medium of claim 27, further comprising instructions causing the machine to compress an advertisement into the distribution broadcast using one or more second compression settings.

39. A method to provide compression settings for encoding a video broadcast, the method comprising:

inserting compression settings into an electronic program guide (EPG) in association with the video broadcast based on a content type of the video broadcast, wherein the compression settings identify values for a group of pictures compression setting, a color compression setting, and a 3/2 pull down compression setting; and distributing the EPG.

40. The method for providing compression settings of claim 39, wherein distributing includes distributing the EPG out-of-band from the video broadcast.

41. The method for providing compression settings of claim 39, wherein distributing includes:

inserting the EPG into video programming; and distributing the EPG in-band with the video programming.

42. A system to provide compression settings for encoding a video broadcast, the system comprising:

an electronic program guide source adapted to insert compression settings into an electronic program guide (EPG) in association with the video broadcast based on a content type of the video broadcast, and adapted to distribute the EPG, wherein the compression settings identify values for a group of pictures compression setting, a color compression setting, and a 3/2 pull down compression setting.

43. The system to provide compression settings of claim 42, wherein the electronic program guide source is adapted to distribute the EPG out-of-band from the video broadcast.

44. The system to provide compression settings of claim 42, wherein the electronic program guide source is adapted to insert the EPG into video programming, and adapted to distribute the EPG in-band with the video programming.

45. A non-transitory machine-readable medium including instructions executable by the machine to provide compression settings for encoding a video broadcast, the instructions causing the machine to:

embed compression settings directly into an electronic program guide (EPG) in association with the video broadcast based on a content type of the video broadcast, wherein the compression settings identify values for a group of pictures compression setting, a color compression setting, and a 3/2 pull down compression setting; and distribute the EPG.

46. The machine-readable medium of claim 45, wherein instructions causing the machine to distribute include instructions to distribute the EPG out-of-band from the video broadcast.

47. The machine-readable medium of claim 45, wherein instructions causing the machine to distribute include instructions to:

insert the EPG into video programming; and distribute the EPG in-band with the video programming.

* * * * *